(12) United States Patent
Yen et al.

(10) Patent No.: US 7,354,555 B2
(45) Date of Patent: Apr. 8, 2008

(54) GAS FLOW CONTROL SYSTEM WITH INTERLOCK

(75) Inventors: Chih-Pen Yen, Kaohsiung (TW);
Jeng-Yann Tsay, Tainan (TW);
Jeng-Chiang Chuang, Kaohsiung (TW); Cheng-Fang Lin, Pingtung (TW); Yung-Mao Hsu, Tainan (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 840 days.

(21) Appl. No.: 10/141,566

(22) Filed: May 8, 2002

(65) Prior Publication Data

US 2003/0211015 A1 Nov. 13, 2003

(51) Int. Cl.
*B32B 5/02* (2006.01)
*B32B 27/04* (2006.01)

(52) U.S. Cl. .................. 422/110; 422/111; 422/114; 422/115; 422/116; 422/117; 710/1

(58) Field of Classification Search ............... 422/110, 422/111, 114, 115, 116, 117; 710/1; 251/129.01
See application file for complete search history.

(56) References Cited

U.S. PATENT DOCUMENTS

| 4,835,114 | A * | 5/1989 | Satou et al. ............... 438/488 |
| 6,550,368 | B2 * | 4/2003 | Leeman et al. ............ 91/513 |
| 6,734,020 | B2 * | 5/2004 | Lu et al. ................... 436/55 |
| 6,814,837 | B1 * | 11/2004 | Lam et al. ............... 204/192.1 |

* cited by examiner

*Primary Examiner*—N. Bhat
(74) *Attorney, Agent, or Firm*—Tung & Associates

(57) ABSTRACT

A system for controlling the flow of gases into a reaction chamber used in processing semiconductor devices includes a safety interlock feature that prevents inadvertent mixing of incompatible, reactive gases. The interlock feature is implemented in an interlock control circuit which operates a valve system for individually controlling the flow of separate gases into the chamber. The interlock circuit includes a series of relay switches and timers arranged to create a time delay between the initiation of flow of gases from separate sources into the chamber.

20 Claims, 2 Drawing Sheets

GAS FLOW CONTROL SYSTEM WITH INTERLOCK

TECHNICAL FIELD

The present invention broadly relates to methods and equipment used to manufacture semiconductor devices, and deals more particularly with a system for controlling the flow of incompatible reactive gasses into a semiconductor processing chamber.

BACKGROUND OF THE INVENTION

In connection with manufacturing processes for producing semiconductor devices, a variety of techniques and processes are used which require the use of reactive gasses. One such common process is chemical vapor deposition (CVD) which is a thin film growth process wherein very high quality films are deposited onto a heated substrate. CVD processes are widely used for forming various layers during integrated circuit fabrication. For example, CVD processes have long been used for deposition of polysilicon, tungsten, silicon nitride, silicon oxynitride and various forms of silicon dioxide. CVD processes are also coming into use for deposition of conductive materials such as aluminum, metal sicilicides, and titanium nitride. CVD processes generally involve a decomposition of a precursor gas mixture, at the surface of the heated substrate, to form components which are the chemical precursors of the desired film composition. For example, polysilicon can be grown by decomposition of dichlorosilane. The CVD process is carried out in a sealed container which is evacuated before the selective introduction of reactive gases. These reactive gases are typically introduced in a serial manner to effect successive process steps. Typically, the reactive gases are delivered to the chamber from individual sources through a series of conduits and valves, which, in many cases result in each of the gases flowing through a single conduit that feeds the gas into the chamber. In many cases, the gases, if mixed, are potentially explosive. In other cases, the admixing of a small amount of residual gas from a prior process into the mainstream of gas flowing into the chamber at the beginning of a second process may result in contamination of the chamber which in turn affects the process and the ultimate quality of the semiconductor devices produced thereby.

Thus, there is a clear need in the art to provide better flow control of reactive, process gases into processing chambers in order to reduce the possibility that even small amounts of incompatible gases may be mixed together or simultaneously introduced into a processing chamber such that the chamber becomes contaminated. The present invention is intended to satisfy this need.

SUMMARY OF THE INVENTION

According to one aspect of the invention, a system is provided for controlling the introduction of chemically reactive gasses into a processing chamber used to manufacture semiconductor devices. The system broadly comprises a pair of valves systems for respectively controlling the flow of first and second reactive gases into the chamber, and a cross interlock circuit coupled with and controlling the valve systems for preventing simultaneous flow of the first and second gases into the chamber. The interlock circuit separately controls the valve systems so as to prevent one valve system from opening until the other valve system has been closed. Additionally, the interlock circuit includes a time delay feature which the delays the opening one valve system until a pre-selected time after the other valve system has been closed. This time delay assures that reactive gases flowing into the chamber from a recently closed valve system will not inadvertently mix with gas allowed to flow into the chamber when the other valve system is opened. Each of the valve systems includes a first, electrically operated valve controlled by the interlock circuit, and a second pneumatically controlled valve operated by the first valve. The pneumatic valve controls the flow of reactive gas from a source into the processing chamber. The interlock circuit may be implemented using discrete relays and timers, or by employing a programmable logic controller.

According to another aspect of the invention, a method is provided for controlling the introduction of chemically reactive gases into a processing chamber used to manufacture semiconductor devices, comprising the steps of: producing first and second control signals for respectably opening first and second valve systems that allow the flow of first and second reactive gases into a processing chamber; delaying the opening of the first valve system for a predetermined length of time after the first control signal is produced; and, delaying the opening of the second valve system for a second predetermined length of time after the second control signal is produced. The steps of delaying the opening of the first and second valve systems prevents potentially hazardous mixing of the first and second reactive gases. The delays are performed by activating timers to establish a time count corresponding to the predetermined time delays, and delivering the respective control signals to the corresponding valve systems only after the time count reaches the pre-determined time delay values.

Accordingly, it is the primary object of the present mentioned to provide a system for controlling the flow of reactive gases into a processing chamber which precludes potentially hazardous mixing of the gases.

Another object of the invention is to provide a system as described above which the limits the possibility of small amounts of residual gases from entering or remaining in the processing chamber at the commencement of a new process step.

A still further object of the present pension is to provide a system of the type described above which utilizes an interlock control circuit utilizing conventional control components.

Another object of the invention is to provide a system as described above which includes a two tiered valve system in which control signals produced by the interlock circuit result in the operation of pneumatically operated valves that control the flow of reactive gases into the chamber.

These, and further objects and advantages of the present invention will be made clear or will become apparent during the course of the following description of a preferred embodiment of the present invention.

BRIEF DESCRIPTION OF THE DRAWINGS

In the drawings which form an integral part of the specification and are to be read in conjunction therewith, and in which like reference numerals are employed to designate identical components in the various views.

DESCRIPTION OF THE PREFERRED EMBODIMENT

Figure 1:
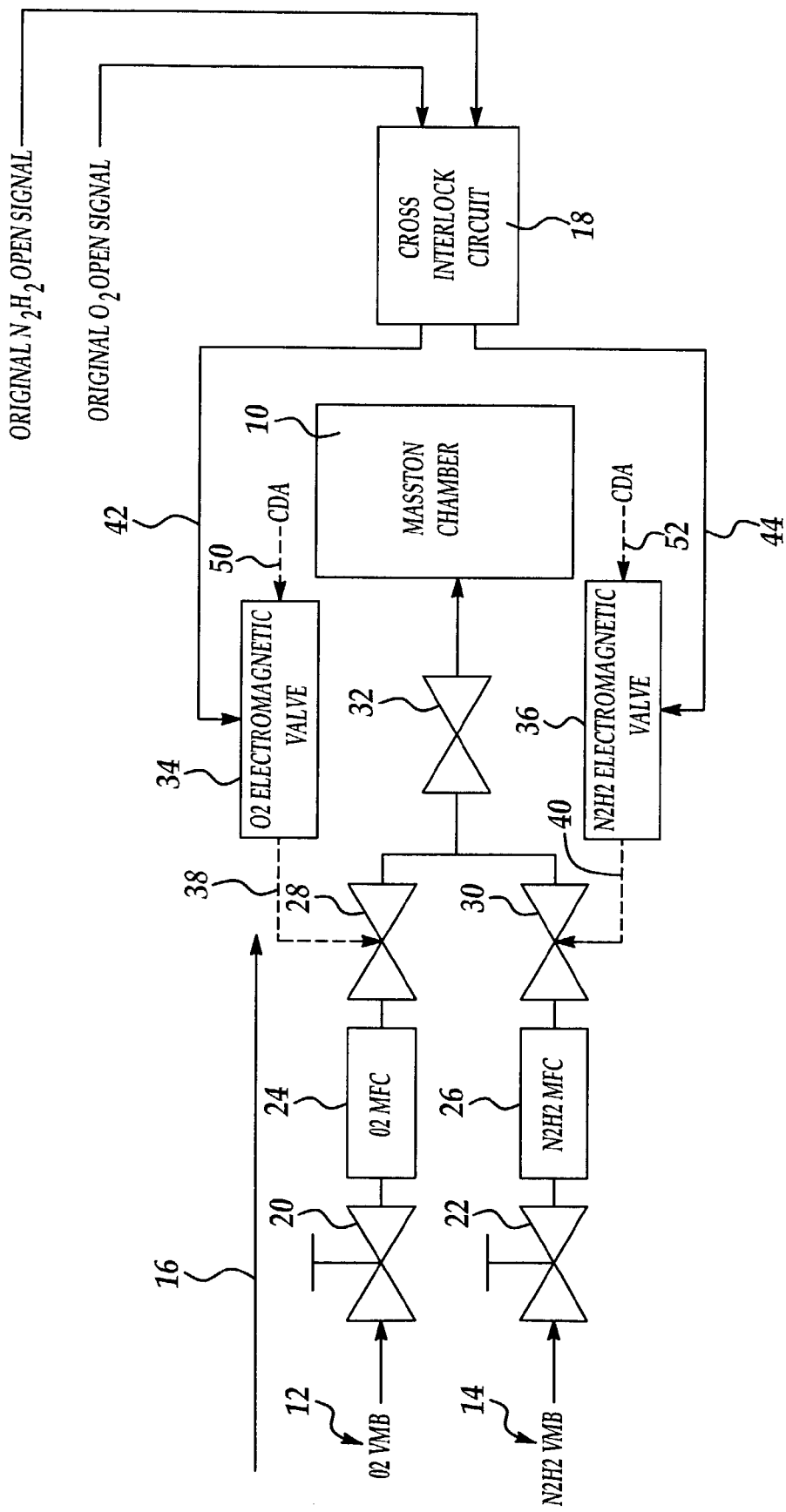
FIG. 1 is a combined block and diagrammatic view of a system for controlling the flow of gas into a semiconductor processing chamber; and, FIG. 2 is a ladder logic diagram of the cross interlock circuit shown in FIG. 1.

Referring first to FIG. 1, the present invention generally relates to a system for controlling the flow of reactive gasses from a source thereof into a processing chamber 10, wherein semiconductor manufacturing processes, such as CVD operations are performed. In the illustrated embodiment, $O_2$ gas is derived from a first, valve manifold box (VMB) 12, and a gas mixture of $N_2$ and $H_2$ is derived from a second valve manifold box 14. The $O_2$ gas from VMB 12 is passed through a manually operated valve 20 to a mass flow controller (MFC) 24. Similarly, the $N_2/H_2$ gas mixture derived from VMB 14 is passed through a second manually operated valve 22, into a second MFC 26.

The VMB's 12, 14 comprise conventional, gas handling boxes, also sometimes referred to as gas isolation boxes, which include an enclosure into which gas handling equipment and/or a source of gas contained in a cylinder are housed. Typically these housings are ventilated and configured to protect the surrounding environment from potentially corrosive or hazardous gasses. The MFC's 24, 26 are also conventional devices well known in the art which are typically used to introduce a specific amount of gas flow for a particular gas species into a reaction chamber so that the appropriate pressure and/or flow rates of gas are achieved. The MFC's 24, 26 may incorporate flow sensors that are calibrated for the corresponding gas and function to determine the flow rate of the gas. The sensor information may also be used in combination with an electronic control system (not shown) to alter actuator settings, such as valves 20, 22 in order to control gas flow.

Gas flows from the MFC's 24, 26 respectively through a pair of metering type valves 28, 30 which typically include a variable orifice for selectively varying the rate at which gas flows therethrough. In effect, valves 28, 30 function as flow restrictors which effectively control the rate at which the chamber 10 becomes pressurized with gas. One suitable commercial version of valve 28, 30 is known as a NuPro valve which is well known in the industry. Normally, the orifice size of valve 28, 30 are selected to provide as fast as possible pressure equalization within the chamber 10 without degrading the quality of the semiconductor wafer being processed in the chamber 10. Valves 28, 30 are each operated by a pressurized fluid such as compressed dried air.

The gases metered through the valves 28, 30 flow through a single final valve 32 before entering the chamber 10. Chamber 10, as previously mentioned, may comprise a conventional reaction chamber in the form of a metal vessel in which chemical reactions can be carried out during the processing of semiconductor wafers. The chamber 10 is leak tight so that low pressures can be achieved for processing, and must be able to withstand the introduction of chemically reactive gasses, elevated temperatures of the wafer, and plasma discharges internal to the chamber.

The metering valves 28, 30 are controlled by a pair of respectively associated, electromagnetically controlled valves 34, 36. Valves 34, 36 are respectively coupled with a source of compressed dried air delivered by lines 50, 52. The operation of valves 34, 36 are controlled by electrical control signals derived on lines 42, 44 from a cross interlock circuit 18. A control signal on line 42 thus actuates valves 34 to either open or closed close. In the open position, valves 34 allows compressed dried air from line 50 to flow through line 38 to the metering valve 28 to either open our close the latter. In a similar manner, electrical controls signals on line 44 causes valve 36 to either open or close. When in the open position, valve 36 allows compressed dried air to flow from line 52 through line 40 to metering valve 30, thereby actuating the latter.

From the foregoing description, it can be appreciated that reactive gasses are derived from sources thereof and are delivered into the chamber 10 through a series of valves, some of which are common to both process gases. Although gases from only two sources 12, 14 are shown in FIG. 1, it is to be understood that with the provision of additional valves and conduits, process gasses may be derived from multiple other sources. In connection with chemically reactive processes that are carried out in the chamber 10, reactive gasses are successively delivered into the chamber 10 in order to carry our successive process steps. In some cases, the reactive gases used in different, successive process steps may react with each other if inadvertently mixed together, which could then result in a hazardous reaction or even an explosion. Such inadvertent mixing could occur if small amounts of one gas remain in certain of the delivery lines or within the chamber 10 while a second gas required for a subsequent step is introduced into the chamber 10.

This potentially hazardous situation may occur because a short amount of time is required after a valve is actuated to cut off the flow of gas before that gas is purged from the delivery lines and chamber 10; if a different reactive gas is introduced into the delivery lines and the chamber 10 too quickly, dangerous mixing of the two gasses can occur.

Figure 2:
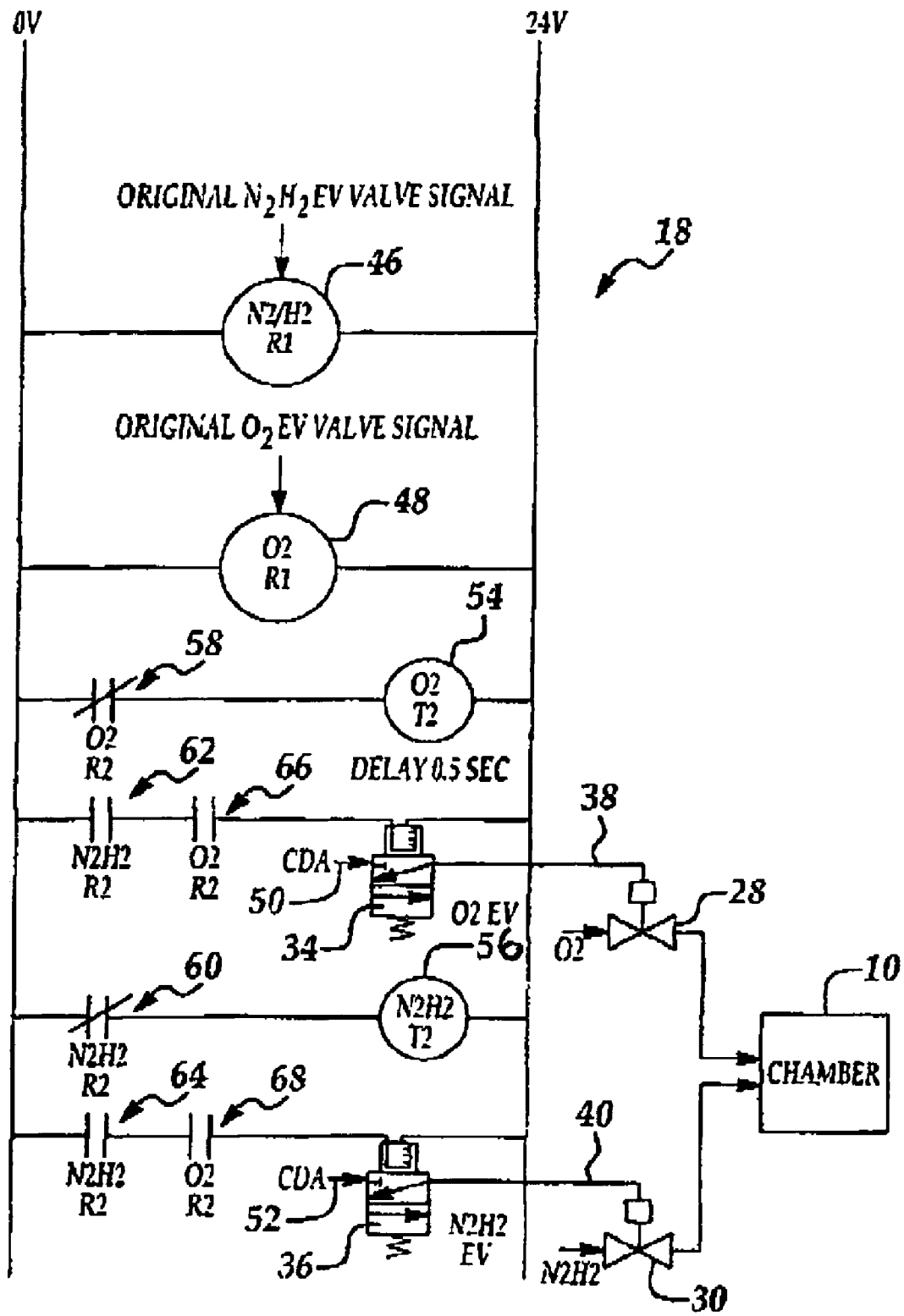

In order to prevent potentially hazardous mixing of reactive gasses, and accordance with the present invention, a novel cross interlock circuit 18 is provided, the details of which are shown in FIG. 2. FIG. 2 is a ladder logic diagram of the circuit 18, and it should be understood that the circuit shown therein may be implemented either in the form of discrete components such as relays or timers, or by a PLC (programmable logic controller). FIG. 2 depicts the circuit in discrete component form in which the components are coupled with a 24 volt power source.

Broadly, the circuit 18 comprises a pair of relays 46, 48 and relay timers 54, 56 which all cooperate to control the metering valves 34, 36 in a manner which provides both an interlock function and a delay function. These two functions not only preclude two different gasses from being introduced into the chamber 10 at the same time, but also provide for a slight time delay between the stoppage of a flow of one gas, and the commencement of flow of another gas required in a subsequent processing step. This time delay is preselected to provide sufficient time to allow residual gas from a previous process to flow through the delivery lines and out of the chamber 10 before the next gas is allowed to flow into chamber 10.

Relay 46 has a coil that is activated by a first valve signal commanding the flow of the $N_2/H_2$ gas mixture. The coil of relay 46 controls a set of normally closed relay contacts 60 which are coupled in series with relay timer 56 and the power source. The coil of relay 46 also operates a second set of normally open contacts 64 which are coupled in series with relay contacts 68, the coil of valve 36 and the power source. Similarly, relay 48 includes a coil that is actuated by a signal commanding the flow of the $O_2$ gas. The coil of relay 48 controls a normally closed set of relay contacts 58, and a normally open set of contacts 62. Relay contacts 58 are coupled in series with the relay timer 54 and the power source. Contacts 62 are coupled in series with relay timer contacts 66, the power source and the actuating coil of metering valve 34. Contacts 66 are controlled by the relay timer 54, while contacts 68 are is controlled by the relay timer 56.

In operation, a control signal delivered to relay 46 commanding the commencement of flow of the $N_2/H_2$ gas mixture energizes the coil of relay 46 causing the normally closed relay 60 to open and the normally closed relay 64 contacts to close. At this point, relay 48 is de-energized, consequently normally closed contacts 58 remain closed and relay timer 54 is coupled with the power source causing contact 68 to close, thus coupling the electromagnetic valve 36 with the power source. With the coil of valve 36 energized, this valve is opened, thereby placing the compressed dried air in line 52 in communication with air line 40. With air line 40 pressurized, metering valve 30 is opened, thereby allowing the $N_2/H_2$ gas mixture to flow from the MFC 26 into the chamber 10. For sake of simplification, the final valve 32 is not shown in FIG. 2.

When the command signal is removed from relay 46 and a command signal is delivered to relay 48 in order to initiate flow of the $O_2$ gas, the following occurs. Deactivation of relay 46 closes contacts 60 and opens contacts 64. Energizing the coil of relay 48 results in contacts 58 opening and contacts 62 closing. However, even though contacts 62 close, contacts 66, controlled by relay timer 56, remain open for a short period of time, for example 0.5 seconds, until relay timer 56 times out. When relay timer 56 reaches a preselected count and times out, contacts 66 are closed, thereby coupling the valve 34 with the power source which results in the closing of the valve 34 and subsequent flow of the $O_2$ gas to the chamber 10.

When relay 48 is switched off and relay 46 is turned back on causing contacts 64 to close, relay timer 54 holds contacts 68 open for the pre-determined length of time to allow the $N_2/H_2$ gas mixture to flow out of the lines and the chamber 10. After relay timer 54 times out, contacts 68 are closed, thereby coupling the power supply with the actuating coil of relay 36.

It is thus apparent that the cross interlock circuit cooperates with a pair of valve systems to prevent inadvertent mixing of two reactive gasses. Relay 46 and contacts 60 form a first actuatable relay circuit for operating one of the valve systems, and relay 48 and its associated contacts 62 function as a second actuatable relay circuit for controlling the operation of the second valve system. Relay timer 56 and its associated contacts 66 function as a first time delay controller for delaying the operation of the fist valve system for a pre-determined length of time after the first relay circuit has been actuated in order to assure that the flow of one gas into the chamber has stopped before the second gas begins to flow. Similarly, relay timer 54 and its associated contacts 68 function as a second time delay controller for delaying the operation of the second valve system for a pre-determined period of time after the second relay circuit has been actuated in order to assure that the flow of the second gas into the chamber has stopped before the first gas begins to flow into the chamber. It may be further appreciated that a method is provided for controlling the introduction of chemically reactive gasses into a processing chamber used to manufacture semiconductor devices which comprises the steps of producing a first control signal for opening a first valve system allowing the flow of a first reactive gas into a chamber; producing a second control signal for opening a second valve system allowing the flow of a second reactive gas into the chamber; delaying the opening of the first valve system for a pre-determined length of time after the first signal is produced; and, delaying the opening of the second valve system for a second pre-determined length of time after the second signal is produced.

From the foregoing, it is apparent that the system of the present invention not only provides for the reliable accomplishment of the objects of the invention, but does so in a particularly simple and economic manner. It is recognized, of course, that those skilled in the art may make various modifications or additions chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A system for controlling the introduction of chemically reactive gases into a processing chamber used to manufacture semiconductor devices to prevent mixing of said reactive gases, comprising:
    a first valve system for controlling the flow of a first reactive gas into said chamber through a delivery line;
    a second valve system for controlling the flow of a second reactive gas into said chamber through said delivery line;
    a cross interlock circuit coupled with and controlling said first and second valve systems, said cross interlock circuit providing an interlock function between said first and second valve systems, said cross interlock circuit adapted to prevent simultaneous flow of said first and second gases into said chamber; and,
    wherein said cross interlock circuit further comprises a time delay function adapted to delay the opening of one of said first and second valve systems for a pre-selected period of time following closing of the other of said first and second valve systems.

2. The system of claim 1, including a source of fluid, and wherein:
    said first valve system includes
        a first fluid operated valve adapted to control the flow of said first reactive gas into said chamber, and
        a first electrically operated valve controlled by said interlock circuit adapted to control the flow of fluid from said source to said first fluid operated valve, and
    said second valve system includes
        a second fluid operated valve adapted to control the flow of said second reactive gas into said chamber, and
        a second electrically operated valve controlled by said interlock circuit adapted to control the flow of fluid from said source to said second fluid operated valve.

3. The system of claim 2, wherein said first and second fluid operated valves each include an output adapted to deliver gas therefrom, and said system further includes a final valve adapted to control the flow of said gases from said output to said chamber.

4. The system of claim 2, wherein said fluid is compressed air.

5. The system of claim 1, wherein said interlock circuit includes:
    a first control circuit adapted to control the operation of said first valve system and including a first electrically operated switch for selectively coupling power to said first valve system, and
    a second control circuit adapted to control the operation of said second valve system and including a second electrically operated switch for selectively coupling power to said second valve system.

6. The system of claim 5, wherein:
said first control circuit includes a third electrically operated switch adapted to prevent power from being coupled to said first valve system when power is coupled to said second valve system,
said second control circuit includes a fourth electrically operated switch adapted to prevent power from being coupled to said second valve system when power is coupled to said first valve system.

7. The system of claim 6, wherein said interlock circuit includes:
a first control device adapted to control the operation of said third switch, and
a second control device adapted to control the operation of said fourth switch.

8. The system of claim 7, wherein:
said first control device includes a timer adapted to produce a delay in the control of the operation of said third switch to comprise said time delay function, whereby said first gas is given ample time to exit said delivery line and exit said chamber before said second valve system initiates the flow of said second gas into said chamber, and
said second control device includes a timer adapted to produce a delay in the operation of said fourth switch to comprise said time delay function, whereby said second gas is given ample time to exit said delivery line and exit said chamber before said first valve system initiates the flow of said first gas into said chamber.

9. A system for controlling the introduction of chemically reactive gases into a processing chamber used to manufacture semiconductor devices to prevent mixing of said reactive gases, comprising:
a first valve system adapted to control the flow of a first reactive gas into said chamber through a delivery line;
a second valve system adapted to control the flow of a second reactive gas into said chamber through said delivery line; and
a cross interlock circuit coupled with and controlling said first and second valve systems adapted to prevent simultaneous flow of said first and second gases into said chamber, said interlock circuit including
a) a first actuatable relay circuit system adapted to control the operation of said first valve system,
b) a second actuatable relay circuit adapted to control the operation of said second valve system,
c) a first time delay controller adapted to delay the operation of said first valve system for a pre-selected period of time after said first relay circuit has been actuated, said pre-selected period of time sufficient to assure that said first gas has exited from said delivery line and said chamber before said second gas begins to flow into said chamber, and,
d) a second time delay controller adapted to delay the operation of said second valve system for a pre-selected period of time after said second relay circuit has been actuated, said pre-selected period of time sufficient to assure that said second gas has exited from said delivery line and said chamber before said first gas begins to flow into said chamber, said first and second time delay controllers adapted to cooperate to prevent undesired mixing of said first and second gases.

10. The system of claim 9, wherein said first time delay controller includes a switch coupled in series with said first relay circuit, and a timer actuator coupled in series with said second relay circuit.

11. The system of claim 10, wherein said second time delay controller includes a switch coupled in series with said second relay circuit, and a timer actuator coupled in series with said first relay circuit.

12. The system of claim 9, wherein:
said first valve system includes
a first fluid operated valve adapted to control the flow of said first reactive gas into said chamber, and
a first electrically operated valve controlled by said interlock circuit adapted to control the flow of fluid from said source to said first fluid operated valve, and
said second valve includes
a second fluid operated valve adapted to control the flow of said second reactive gas into said chamber, and
a second electrically operated valve controlled by said interlock circuit adapted to control the flow of fluid from said source to said second fluid operated valve.

13. The system of claim 12, wherein said first and second fluid operated valves each include an output adapted to deliver gas therefrom, and said system further includes a final valve adapted to control the flow of said gases from said output to said chamber.

14. The system of claim 12, wherein said fluid is compressed air.

15. The system of claim 1, wherein said pre-selected time is sufficient to allow one of said first and second gases to exit said delivery line and said chamber prior to beginning the flow of the other of said first and second gases.

16. A system for controlling the introduction of chemically reactive gases into a processing chamber used to manufacture semiconductor devices to prevent mixing of said reactive gases, comprising:
a first valve system for controlling the flow of a first reactive gas into said chamber through a delivery line;
a second valve system for controlling the flow of a second reactive gas into said chamber through said delivery line;
a cross interlock circuit coupled with and controlling said first and second valve systems, said cross interlock circuit providing an interlock function between said first and second valve systems, said cross interlock circuit adapted to prevent simultaneous flow of said first and second gases into said chamber; and,
wherein said cross interlock circuit further comprises a time delay function adapted to delay the opening of one of said first and second valve systems for a pre-selected period of time following closing of the other of said first and second valve systems, said preselected time sufficient to allow one of said first and second gases to exit said delivery line and said chamber prior to beginning the flow of the other of said first and second gases.

17. The system of claims 16, wherein said interlock circuit further comprises:
a) a first actuatable relay circuit systems adapted to control the operation of said first valve system,
b) a second actuatable relay circuit adapted to control the operation of said second valve system,
c) a first time delay controller adapted to delay the operation of said first valve system for said pre-selected period of time after said first relay circuit has been actuated, and,
d) a second time delay controller adapted to delay the operation of said second valve system for said pre-selected period of time after said second relay circuit has been actuated.

18. The system of claim 17, wherein said first time delay controller includes a switch coupled in series with said first relay circuit, and a timer actuator coupled in series with said second relay circuit.

19. The system of claim 17, wherein said second time delay controller includes a switch coupled in series with said second relay circuit, and a timer actuator coupled in series with said first relay circuit.

20. The system of claim 16, including a source of fluid, and wherein:

said first valve system includes:

a first fluid operated valve adapted to control the flow of said first reactive gas into said chamber; and, a first electrically operated valve controlled by said interlock circuit adapted to control the flow of fluid from said source to said first fluid operated valve; and, said second valve system includes:

a second fluid operated valve adapted to control the flow of said second reactive gas into said chamber; and, a second electrically operated valve controlled by said interlock circuit adapted to control the flow of fluid from said source to said second fluid operated valve.

\* \* \* \* \*